(12) United States Patent
McGuigan Flook et al.

(10) Patent No.: US 10,087,275 B2
(45) Date of Patent: Oct. 2, 2018

(54) FUNCTIONALIZED ELASTOMER CONTAINING A NITROGEN GROUP

(71) Applicant: The Goodyear Tire & Rubber Company, Akron, OH (US)

(72) Inventors: Margaret McGuigan Flook, Kent, OH (US); Inigo Gottker genannt Schnetmann, Konstanz (DE); Hannes Leicht, Konstanz (DE); Stefan Mecking, Konstanz (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 257 days.

(21) Appl. No.: 14/973,771

(22) Filed: Dec. 18, 2015

(65) Prior Publication Data

US 2016/0177009 A1 Jun. 23, 2016

(51) Int. Cl.
| C08F 236/06 | (2006.01) |
| C08F 230/08 | (2006.01) |
| C08F 236/14 | (2006.01) |
| B60C 1/00 | (2006.01) |
| C08F 4/619 | (2006.01) |

(52) U.S. Cl.
CPC .......... *C08F 236/06* (2013.01); *B60C 1/00* (2013.01); *B60C 1/0016* (2013.01); *C08F 230/08* (2013.01); *C08F 236/14* (2013.01); *C08F 4/619* (2013.01); *C08F 4/61908* (2013.01)

(58) Field of Classification Search
CPC ....... B60C 1/00; B60C 1/0016; C08F 230/08; C08F 236/06; C08F 236/14; C08F 4/619; C08F 4/61908
USPC ...................................................... 526/310
See application file for complete search history.

(56) References Cited

U.S. PATENT DOCUMENTS

| 4,147,880 | A | 4/1979 | Kline | |
| 6,344,538 | B1 | 2/2002 | Sheares | |
| 6,583,260 | B2 | 6/2003 | Sheares | |
| 6,627,721 | B1 | 9/2003 | Rodewald et al. | |
| 8,598,286 | B1 | 12/2013 | Flook | |
| 2002/0151673 | A1* | 10/2002 | Sheares | C08G 64/205 528/196 |
| 2004/0044202 | A1* | 3/2004 | Halasa | C07D 227/04 540/612 |
| 2014/0088256 | A1 | 3/2014 | Fujii | |
| 2014/0303319 | A1 | 10/2014 | Fujii | |

FOREIGN PATENT DOCUMENTS

| JP | 09080752 A | * | 3/1997 |
| WO | 2004007602 A2 | | 1/2004 |

OTHER PUBLICATIONS

Borg-Visse et al., Polymerization and copolymerization of 2-phthalimidomethyl 1,3-butadiene. I. Preliminary studies of free radical polymerization and polymerizations initiated by various transition metal allyl complexes, Journal of Polymer Science: Polymer Chemistry Edition, vol. 18, 2481-2489 (1980).*
Machine translation of JP-09080752-A. (Year: 1997).*
European Search Report dated Feb. 20, 2017 for Application Serial No. EP16202899.
Abby R. O'Connor, et al., Polymerization of 1 3-Dienes and Styrene Catalyzed by Cationic Allyl Ni(II) Complexes, Journal of Polymer Science: Part A: Polymer Chemistry, 2010, pp. 1901-1912, vol. 48.
Abby R. O'Connor, et al., Synthesis and Reactivity of Cationic (Allyl)(arene)nickel(II) and (Allyl)(arene)palladium (II) Complexes, Organometallics, 2009, pp. 2372-2384, 28.
Abby R. O'Connor, et al., Synthesis, Characterization, and Reactivity Studies of (Cyclohexenyl)nickel(II) Complexes, Organometallics, 2010, pp. 5382-5389, 29.
Abby R. O'Connor, et al., The Mechanism of Polymerization of Butadiene by "Ligand-Free" Nickel(II) Complexes, J. Am. Chem. Soc., 2007, pp. 4142-4143, 129.

* cited by examiner

*Primary Examiner* — Wenwen Cai
(74) *Attorney, Agent, or Firm* — John D. DeLong

(57) ABSTRACT

The present invention is directed to a copolymer of a monomer selected from the group consisting of 1,3-butadiene and isoprene, and a monomer of formula I

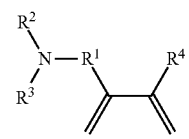

wherein $R^1$ is phenylene, or a linear or branched alkane diyl group containing 2 to 10 carbon atoms, or a combination of one or more phenylene groups and one or more linear or branched alkane diyl groups containing 1 to 10 carbon atoms; $R^2$ and $R^3$ are independently phenyl or a linear or branched alkyl group containing 1 to 10 carbon atoms, or one of $R^2$ and $R^3$ is hydrogen and the other is phenyl or a linear or branched alkyl group containing 1 to 10 carbon atoms, or $R^2$ and $R^3$ taken together with the nitrogen atom represent a nitrogen containing heterocyclic group containing from 4 to 12 carbon atoms; and $R^4$ is hydrogen or a linear or branched alkyl group containing 1 to 10 carbon atoms. The invention is further directed to a rubber composition including the copolymer, and a pneumatic tire containing the rubber composition. The invention is further directed to a method of making such a copolymer.

13 Claims, No Drawings

FUNCTIONALIZED ELASTOMER CONTAINING A NITROGEN GROUP

BACKGROUND

Stereoregular diene polymers are produced and used industrially on a large scale as an important component of tire compounds. Diene polymers with high levels of stereoregularity are almost exclusively prepared with coordination polymerization catalysts, which are in general easily poisoned by polar functionalities. Because of this poisoning effect, the types of monomers that are compatible with coordination catalysts are usually limited to simple hydrocarbons. It is well known within the tire industry that the incorporation of even low levels of functionality into certain tire polymers (prepared through anionic or emulsion polymerization) significantly improves the performance of tires containing such polymers. Unfortunately, there is currently no reliable method to apply this functionalization technology to stereoregular diene polymers, but it is likely that such a polymer would show superior tire properties over known unfunctionalized polymers.

WO2004/007602 discloses a catalyst for the polymerization of 1,4-dienes, styrene and for the copolymerization of two monomers. The characteristics of the inventive catalyst include a high degree of stereoselectivity, catalytic activity and tolerance to the presence of polar impurities. Said catalyst combines the characteristics specific to Ni-based diene polymerization catalysts (high stereoselectivity and catalytic activity) with a well-defined character and tolerance to the presence of polar substances.

O'Connor et al. (*Journal of Applied Polymer Science, Part A: Polymer Chemistry*, Vol. 48, 1901-1912 (2010)) disclose polymerization of 2,3 bis(4-trifluoroethoxy-4-oxobutyl)-1,3-butadiene catalyzed by a cationic ally (Ni)II complex. Attempts to polymerize the monomer with the ester groups replaced by more basic amino and hydroxy functional groups were unsuccessful.

U.S. Pat. No. 6,627,721 discloses functionalized elastomers made by anionic polymerization of diene monomer and a functional vinyl aromatic monomer having a nitrogen-containing group.

U.S. Pat. Nos. 6,100,373; 6,344,538; and 6,583,260 disclose functionalized diene monomers and polymers containing functionalized dienes and methods for their preparation.

SUMMARY

The present invention is directed to a copolymer of 1,3-butadiene or isoprene and a monomer of formula I

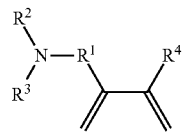

wherein $R^1$ is phenylene, or a linear or branched alkane diyl group containing 2 to 10 carbon atoms, or a combination of one or more phenylene groups and one or more linear or branched alkane diyl groups containing 1 to 10 carbon atoms; $R^2$ and $R^3$ are independently phenyl or a linear or branched alkyl group containing 1 to 10 carbon atoms, or one of $R^2$ and $R^3$ is hydrogen and the other is phenyl or a linear or branched alkyl group containing 1 to 10 carbon atoms, or $R^2$ and $R^3$ taken together with the nitrogen atom represent a nitrogen containing heterocyclic group containing from 4 to 12 carbon atoms; and $R^4$ is hydrogen or a linear or branched alkyl group containing 1 to 10 carbon atoms. The invention is further directed to a rubber composition including the copolymer, and a pneumatic tire containing the rubber composition.

The invention is further directed to a method of making such a copolymer.

DESCRIPTION

There is disclosed a copolymer of 1,3-butadiene or isoprene and a monomer of formula I

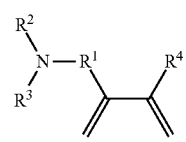

wherein $R^1$ is phenylene, or a linear or branched alkane diyl group containing 2 to 10 carbon atoms, or a combination of one or more phenylene groups and one or more linear or branched alkane diyl groups containing 1 to 10 carbon atoms; $R^2$ and $R^3$ are independently phenyl or a linear or branched alkyl group containing 1 to 10 carbon atoms, or one of $R^2$ and $R^3$ is hydrogen and the other is phenyl or a linear or branched alkyl group containing 1 to 10 carbon atoms, or $R^2$ and $R^3$ taken together with the nitrogen atom represent a nitrogen containing heterocyclic group containing from 4 to 12 carbon atoms; and $R^4$ is hydrogen or a linear or branched alkyl group containing 1 to 10 carbon atoms.

There is further disclosed a rubber composition including the copolymer, and a pneumatic tire containing the rubber composition.

There is further disclosed a method of making such a copolymer.

The copolymer is produced via polymerization of a nonfunctionalized diene monomer and a functionalized diene monomer.

In one embodiment, the nonfunctionalized diene monomer is 1,3-butadiene or isoprene. In one embodiment, the functionalized diene monomer is a monomer of formula I

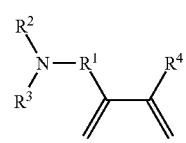

wherein $R^1$ is phenylene, or a linear or branched alkane diyl group containing 2 to 10 carbon atoms, or a combination of one or more phenylene groups and one or more linear or branched alkane diyl groups containing 1 to 10 carbon atoms; $R^2$ and $R^3$ are independently phenyl or a linear or branched alkyl group containing 1 to 10 carbon atoms, or one of $R^2$ and $R^3$ is hydrogen and the other is phenyl or a linear or branched alkyl group containing 1 to 10 carbon atoms, or $R^2$ and $R^3$ taken together with the nitrogen atom represent a nitrogen containing heterocyclic group containing from 4 to 12 carbon atoms; and $R^4$ is hydrogen or a linear or branched alkyl group containing 1 to 10 carbon atoms.

In one embodiment, the nitrogen containing heterocyclic group is one of the following moieties:

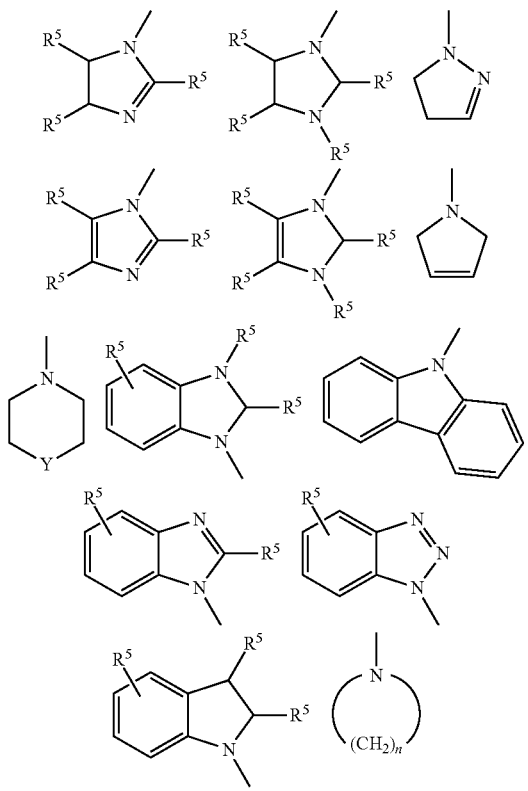

wherein $R^5$ groups can be the same or different and represent a member selected from the group consisting of linear or branched alkyl groups containing from 1 to about 10 carbon atoms, aryl groups, allyl groups, and alkoxy groups, and wherein Y represents oxygen, sulfur, or a methylene group, and n is an integer from 4 to 12.

In one embodiment, the nonfunctionalized monomer is selected from 1,3-butadiene and isoprene.

The copolymer has a high degree of stereoregularity. In one embodiment, the copolymer has a cis 1,4 microstructure content of greater than 80 percent by weight based on the polybutadiene content of the copolymer. In one embodiment, the copolymer has a cis 1,4 microstructure content of greater than 95 percent by weight based on the polybutadiene content of the copolymer.

The copolymer has a major weight portion attributed to units derived from the nonfunctionalized monomer, and a minor weight portion attributed to units derived from the functionalized monomer. In one embodiment, the copolymer comprises from 0.1 to 40 percent by weight of units derived from the functionalized diene monomer. In one embodiment, the copolymer comprises from 0.5 to 20 percent by weight of units derived from the functionalized diene monomer. In one embodiment, the copolymer comprises from 1 to 5 percent by weight of units derived from the functionalized diene monomer.

The copolymer is produced by polymerization of the nonfunctionalized monomer and functionalized monomer in the presence of a nickel coordination catalyst. In one embodiment, the catalyst is an (allyl)(arene)Ni(II) compound. Suitable (allyl)(arene)Ni(II) compounds may be produced as described in O'Connor et al. (*Organometallics* 2009, 28 2372-2384). The catalyst is generally in the form of a cation with a suitable counteranion. In one embodiment, the counteranion is tetrakis(3,5-bis(trifluoromethyl)phenyl) borate (i.e. $BAr^F_4{}^-$). In one embodiment, the catalyst is the (allyl)(mesitylene)Ni(II)$^+$ $BAr^F_4{}^-$ complex as shown in formula II

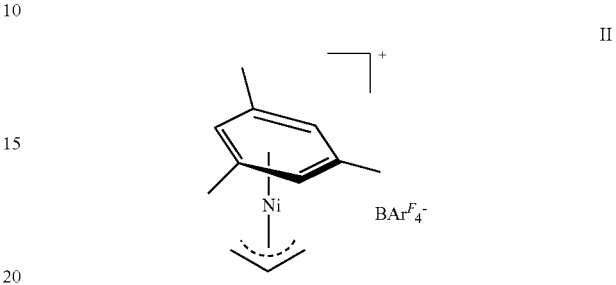

The polymerization using the (allyl)(arene)Ni(II) catalysts may be done following the methods as described in O'Connor et al. (*Journal of Applied Polymer Science, Part A: Polymer Chemistry*, Vol. 48, 1901-1912 (2010)). The copolymerization may be carried out by solution polymerization at a temperature ranging from 0 to 60 C. Suitable solvents for the solution polymerization include toluene, methylene chloride, and heptane, and the like.

The copolymer may be compounded into a rubber composition.

The rubber composition may optionally include, in addition to the functionalized copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 Parts, 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207, 757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Synthesis of the Ni catalyst II is described in literature (O'Connor et al. *Organometallics* 2009, 28 2372-2384).

Alternatively, a mixture of this complex with Mg-salts and excess NaBAr$^F_4$ can be generated by following the outlined procedure of example 2.

Example 2

In this example, the synthesis of a Ni(II) coordination catalyst is illustrated. The compound of formula III was converted to the compound of formula II as follows. Compound III (8 mmol) was combined with NaBAr$^F_4$ (8 mmol) and mesitylene (20 mmol) in 40 ml of diethyl ether in a 100 ml Schlenk tube and cooled −78 C. After 5 minutes, 8 ml of 1 M allyl magnesium bromide in diethyl ether was dropwise added under stirring, and the temperature increased to −20 C by exchange of the cooling bath after the addition of allyl magnesium bromide was complete. After 60 minutes at −20 C, the cooling bath was removed and the mixture warmed to 25 C at which the ether was distilled off at 25 C to leave a crude solid. Methylene chloride (30 ml) was then added and the mixture was agitated, followed by filtration of the solids. Heptane (10 mL) was added to the methylene chloride solution and the resulting mixture concentrated to dryness under high vacuum to leave 6.85 g of solids containing about 50% yield of the catalyst II based on Ni.

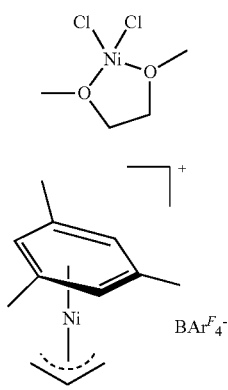

Example 3

In the following examples, the copolymerization of 1,3 butadiene and isoprene with 9-(5-methylenehept-6-en-1-yl)-9H-carbazole (formula IV) are illustrated. The functional monomer 9-(5-methylenehept-6-en-1-yl)-9H-carbazole was synthesized as follows:

Synthesis of 9-(5-methylenehept-6-en-1-yl)-9H-carbazole

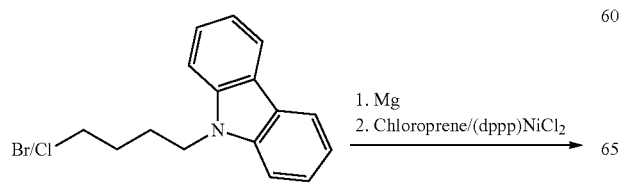

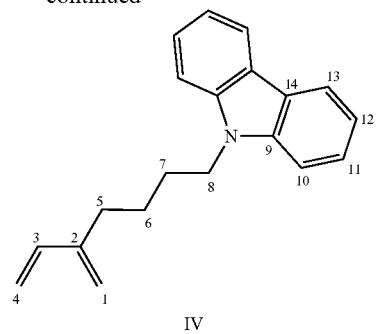

IV 280 mg Mg turnings (11 mmol, 1.1 equiv) were layered with 10 mL THF and activated with 0.05 mL 1,2-Dibromoethane (0.5 mmol, 0.05 equiv). A solution of 2.58 g (10 mmol, 1 equiv) 9-(4-chlorobutyl)-9H-carbazole (9-(4-chloro/bromo-butyl)-9H-carbazole was synthesized according to *J. Med. Chem.*, 2014, 57 (16), pp 6973-6988) in 40 mL THF was added dropwise. The reaction mixture was stirred for 3 days at 50° C. Residual Mg was filtered off.

The Grignard-reagent was added dropwise at 0° C. to a solution of 57 mg (dppp)NiCl$_2$ and 11 mmol Chloroprene in 13 mL THF. After stirring for 1.5 h at room temperature, the reaction mixture was poured into H$_2$O/HCl. The aqueous phase was extracted 5 times with Et$_2$O and the combined organic phases were dried over Na$_2$SO$_4$. Removal of the solvent under reduced pressure gave the crude product as a yellow/orange cloudy oil. The crude product was purified by sonication with pentane followed by filtration. The desired product was obtained after removal of the pentane as light yellow oil. Yield: 1.73 g (6.28 mmol, 63%).

$^1$H NMR (400 MHz, C$_6$D$_6$) δ=8.06 (m, 2H, H13), 7.41 (m, 2H, H11), 7.23 (m, 2H, H12), 7.16 (m, 2H, H10), 6.27 (dd, J=17.6, 10.8 Hz, 1H, H13), 5.05 (d, J=17.6 Hz, 1H, H4), 4.92 (d, J=10.8 Hz, 1H, H4), 4.89 (s, 1H, H1), 4.77 (s, 1H, H1), 3.76 (t, J=7.2 Hz, 2H, H8), 1.92 (t, J=7.6 Hz, 2H, H5), 1.48 (m, 2H, H6), 1.28 (m, 2H, H7).

$^{13}$C NMR (100 MHz, C$_6$D$_6$) δ=146.0 (C2), 140.8 (C9), 139.1 (C3), 125.9 (C12), 123.5 (C14), 120.8 (C13), 119.2 (C11), 116.9 (C1), 113.2 (C4), 108.9 (C10), 42.7 (C8), 31.1 (C5), 28.8 (C6), 25.7 (C7).

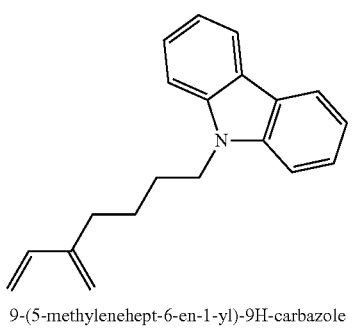

9-(5-methylenehept-6-en-1-yl)-9H-carbazole

Example 4

Co-Polymerization of 1,3-butadiene and 9-(5-methylenehept-6-en-1-yl)-9H-carbazole Using Compound II in Toluene The functional monomer of formula IV was synthesized as described in Example 3.

The monomer of formula IV was added to a flame-dried schlenk-flask as toluene solution (total volume of toluene 15) and the flask was subsequently sealed with a rubber septum. The solution was saturated at r.t. with 1.05 bar BD pressure and the polymerization was initiated by adding the catalyst in toluene (5 mL) at the indicated reaction temperature. The polymerization was allowed to run at that temperature for the indicated time. 0.5 mL of NEt3 were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-9-(5-methylenehept-6-en-1-yl)-9H-carbazole). Samples were analyzed with results given in Table 1. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 1

| Sample No. | 1 | 2 |
|---|---|---|
| amount of catalyst, μmol | 10 | 10 |
| temperature, ° C. | r.t.[1] | r.t. |
| time, h | 0.42 | 1 |
| butadiene, bar | 1.05 | 1.05 |
| comonomer of formula IV, mmol | 0.67 | 2 |
| yield, g | 5.8 | 7.4 |
| comonomer incorporation, mol % | 0.48 | 1.2 |
| comonomer conversion, % | 69 | 82 |
| $M_n$, 10³g/mol | 52 | 48 |
| PDI | 3 | 2.8 |
| $T_g$, ° C. | −96 | −96 |
| Microstructure, % 1,4-cis | 96 | 95 |

[1]room temperature

Example 5

In this example, the synthesis of 9-(4-(2-methylenebut-3-en-1-yl)benzyl)-9H-carbazole is illustrated. The functional monomer 9-(4-(2-methylenebut-3-en-1-yl)benzyl)-9H-carbazole (formula V) was synthesized as follows:

Synthesis of 9-(4-(2-methylenebut-3-en-1-yl)benzyl)-9H-carbazole

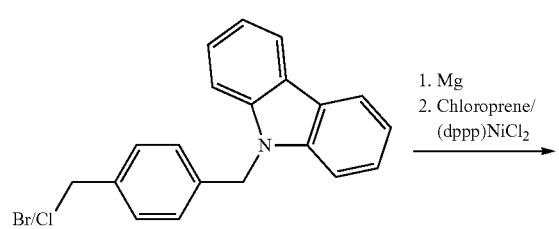

-continued

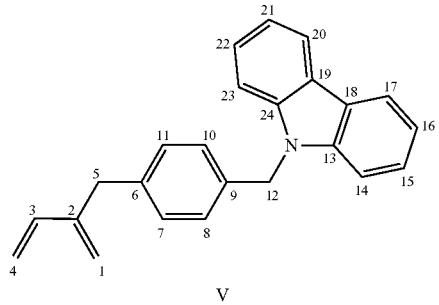

V 46 mg Mg turnings (1.9 mmol, 1.9 equiv) were layered with THF and 0.05 mL dibromethane was added to activate the magnesium. 306 mg 9-(4-(chloromethyl)benzyl)-9H-carbazole (1 mmol, 1 equiv, prepared in analogy to *J. Med. Chem.*, 2014, 57 (16), pp 6973-6988) in 2 mL of THF were added dropwise. The reaction was stirred for 3 h at 55° C. Residual magnesium was filtered off.

The Grignard-reagent was added dropwise to a mixture of chloroprene (1.1 mmol, 1.1 equiv) and (dppp)NiCl$_2$ in THF (10 mL) at 0° C. Reaction was stirred for 1 h at room temperature and then quenched by addition of H$_2$O/HCl. The crude product was obtained by extraction with Et$_2$O followed by removal of the solvent and purified by dissolution in MeOH and filtration of the insoluble impurities. Removal of the solvent under reduced pressure gave 87 mg (0.27 mmol, 27%) of the desired compound.

$^1$H NMR (400 MHz, C$_6$D$_6$) δ=8.06 (d, J=7.9 Hz, 2H, H17 and H20), 7.31 (vt, J=7.5 Hz, 2H, H15 and H22), 7.21 (vt, J=7.5 Hz, 2H, H16 and 21), 7.10 (d, J=8.2 Hz, 2H, H14 and H23), 6.85 (d, J=7.8 Hz, 2H, H7 and 11), 6.80 (d, J=7.8 Hz, 2H, H8 and 10), 6.29 (dd, J=17.5, 10.8 Hz, 1H, H3), 5.07 (d, J=17.5 Hz, 1H, H4), 4.98 (s, 1H, H1), 4.93 (s, 2H, H12), 4.88 (d, J=10.8 Hz, 1H, H4), 4.75 (s, 1H, H1), 3.27 (s, 2H, H5).

$^{13}$C NMR (100 MHz, C$_6$D$_6$) δ=145.5 (C2), 141.2 (C13 and C24), 138.8 (C3), 138.7 (C6), 135.4 (C9), 129.5 (C7 and C11), 126.5 (C8 and C10), 126.2 (C15 and C22), 123.7 (C18 and C19), 120.8 (C17 and C20), 119.6 (C16 and C21), 118.3 (C1), 114.5 (C4), 109.3 (C14 and C23), 46.2 (C12), 37.9 (C5).

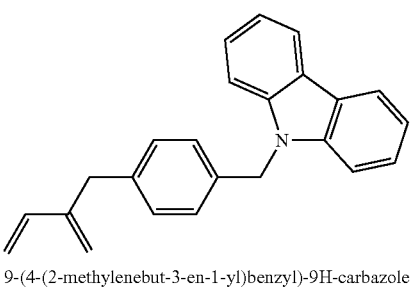

9-(4-(2-methylenebut-3-en-1-yl)benzyl)-9H-carbazole

Example 6

Co-Polymerization of 1,3-butadiene and 9-(4-(2-methylenebut-3-en-1-yl)benzyl)-9H-carbazole Using Compound II in Toluene The functional monomer of formula V was synthesized as described in Example 5.

The monomer of formula V was added to a flame-dried schlenk-flask as toluene solution (total volume of toluene 15) and the flask was subsequently sealed with a rubber septum. The solution was saturated at r.t. with 1.05 bar BD pressure and the polymerization was initiated by adding the catalyst in toluene (5 mL) at the indicated reaction temperature. The polymerization was allowed to run at that temperature for the indicated time. 0.5 mL of NEt3 were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-9-(5-methylenehept-6-en-1-yl)-9H-carbazole). Samples were analyzed with results given in Table 2. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 2

| Sample No. | 3 |
| --- | --- |
| amount of catalyst, μmol | 10 |
| temperature, ° C. | r.t. |
| time, h | 1.2 |
| butadiene, bar | 1.05 |
| comonomer of formula V, mmol | 0.21 |
| yield, g | 6 |
| comonomer incorporation, mol % | 0.07 |
| comonomer conversion, % | 37 |
| $M_n$, $10^3$ g/mol | 59 |
| PDI | 3.1 |
| $T_g$, ° C. | −96 |
| Microstructure, % 1,4-cis | 96 |

Example 7

In this example, the synthesis of N-(5-methylenehept-6-en-1-yl)-N-phenylaniline is illustrated. The functional monomer N-(5-methylenehept-6-en-1-yl)-N-phenylaniline (formula VI) was synthesized as follows:

Synthesis of
N-(5-methylenehept-6-en-1-yl)-N-phenylaniline

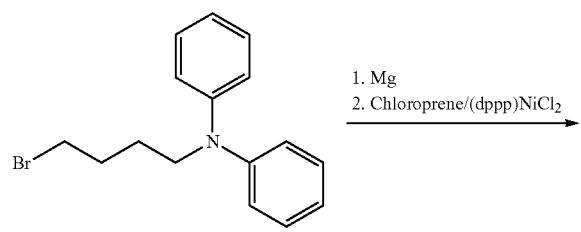

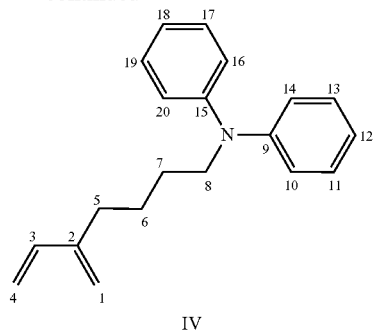

IV

Magnesium turnings (0.36 g, 15 mmol, 1.5 equiv) were with 2 mL THF and activated with dibromoethane (1 mmol, 0.1 equiv). A solution of N-(4-bromobutyl)-N-phenylaniline (2.6 g, 10 mmol, 1 equiv) and dibromoethane (1 mmol, 0.1 equiv) in THF (15 mL) was added and the mixture was refluxed for 30 minutes. After filtration to remove excess Mg, the prepared Grignard reagent was added dropwise to a suspension of (dppp)NiCl$_2$ (60 mg, 0.11 mmol) and chloroprene solution (11 mmol, 1.1 equiv) in 5 mL THF at 0° C. The mixture was warmed to r.t. and stirred for 12 h. Ethyl acetate was added and the organic phase was washed with an ammonium chloride solution. The solvent was removed under reduced pressure and the crude product was purified by column chromatography (PE/EtOAc 10:1) to give the desired product as a colorless oil. Yield: 2.16 g (7.79 mmol, 78%)

$^1$H-NMR (400 MHz, C$_6$D$_6$): δ=7.15-7.10 (m, 4H, H10, H14, H16, and H20), 6.98-6.95 (m, 4H, H11, H13, H17, and H19), 6.86-6.82 (m, 2H, H12 and H18), 6.29 (dd, $^3$J=17.6 and 10.8 Hz, 1H, H3), 5.08 (d, J=17.6 Hz, 1H, H4), 4.93 (m, 1H, H4), 4.92 (m, 1H, H1), 4.85 (m, 1H, H1), 3.49 (t, J=7.5 Hz, 2H, H8), 2.01 (td, $^3$J=7.6 and $^4$J=1.2 Hz, 2H, H5), 1.53 (m, 2H, H7), 1.35 (m, 2H, H6).

$^{13}$C-NMR (100 MHz, C$_6$D$_6$): δ=148.7 (C19 and C20), 146.5 (C2), 139.2 (C3), 129.5 (C11, C13, C17, and C19) 121.5 (C12 and C18), 121.4 (C10, C14, C16, and C20), 115.8 (C4), 113.2 (C1), 52.3 (C8), 31.3 (C5), 27.7 (C7), 25.8 (C6).

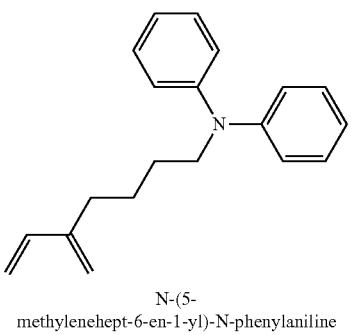

VI

N-(5-methylenehept-6-en-1-yl)-N-phenylaniline

Example 8

Co-Polymerization of 1,3-butadiene and N-(5-methylenehept-6-en-1-yl)-N-phenylaniline Using Compound II in Toluene The functional monomer of formula VI was synthesized as described in Example 7.

The monomer of formula VI was added to a flame-dried schlenk-flask as toluene solution (total volume of toluene 15 mL for example 4 and 5, and 35 mL for example 6) and the flask was subsequently sealed with a rubber septum. Butadiene was added by saturation of the toluene at the reaction temperature with a pressure of 1.05 bar. The polymerization was initiated by adding the catalyst in toluene (5 mL) at the indicated reaction temperature. The polymerization was allowed to run at that temperature for the indicated time. 0.5 mL of NEt3 were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-N-(5-methylenehept-6-en-1-yl)-N-phenylaniline). Samples were analyzed with results given in Table 3. Molecular weight Mn and polydispersity (PDI) were measured using GPC in THF vs. polystyrene standards. Glass transition temperature Tg was measured using DSC. The microstructure of the polymer was determined by NMR-analyses ($^1$H and $^{13}$C).

TABLE 3

| Sample No. | 4 | 5 | 6 |
|---|---|---|---|
| amount of catalyst, µmol | 10 | 10 | 6 |
| temperature, ° C. | r.t. | r.t. | 0 |
| time, h | 1.5 | 0.5 | 4 |
| butadiene, bar | 1.05 | 1.05 | 1.05 |
| comonomer, mmol | 1 | 1 | 0.50 |
| yield, g | 3.5 | 6.3 | 6.2 |
| comonomer incorporation, mol % | 0.89 | 0.56 | 0.27 |
| comonomer conversion, % | 58 | 65 | 60 |
| $M_n$, $10^3$ g/mol | 57 | 44 | 123 |
| PDI | 2.2 | 3.2 | 2.2 |
| $T_g$, ° C. | −94 | −93 | −95 |
| Microstructure, % 1,4-cis | 96 | 96 | 96 |

Example 9

In this example, the synthesis of 4-(buta-1,3-dien-2-yl)-N,N-dimethylaniline is illustrated. The functional monomer 4-(buta-1,3-dien-2-yl)-N,N-dimethylaniline (formula VII) was synthesized as follows:

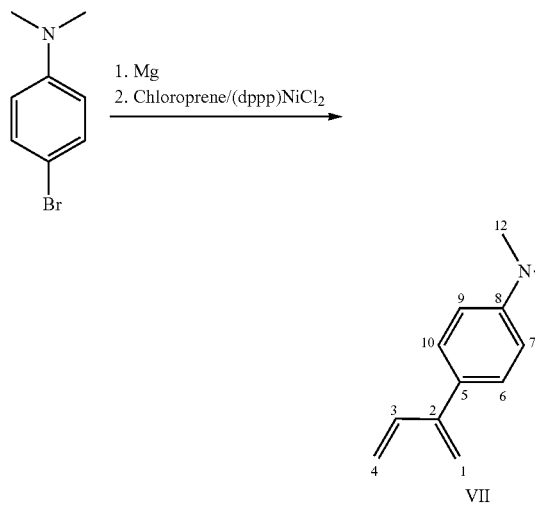

Magnesium turnings (0.36 g, 15 mmol, 1.5 equiv) were layered with 2 mL THF and activated with dibromoethane (1 mmol, 0.1 equiv). A solution of 4-bromo-N,N-dimethylaniline (2.0 g, 10 mmol, 1 equiv) and dibromoethane (1 mmol, 0.1 equiv) in THF (15 mL) was added and the mixture was refluxed for 60 minutes. After filtration to remove excess Mg, the prepared Grignard reagent was added dropwise to a suspension of (dppp)NiCl$_2$ (60 mg, 0.11 mmol) and chloroprene solution (11 mmol, 1.1 equiv) in 5 mL THF at 0° C. The mixture was warmed to r.t. and stirred for 12 h. An aliquot was taken (0.25 mL) and diluted with heptane, precipitated Mg-salts were remove by centrifugation, and the supernatant was concentrated under vacuum. NMR analysis indicates formation of 4-(buta-1,3-dien-2-yl)-N,N-dimethylaniline in ca 85% yield. 4-(buta-1,3-dien-2-yl)-N,N-dimethylaniline due to [4+2]cycloaddition reaction is not stable in concentrated samples and was used as diluted heptane solution. Therefore the thf reaction solution was added to 50 mL heptane, magnesium salts were filtered off, and the resulting solution was concentrated under vacuum to obtain 8.65 g of a heptane solution containing 1282 mg 4-(buta-1,3-dien-2-yl)-N,N-dimethylaniline (74% yield) by NMR analysis.

$^1$H NMR (400 MHz, C$_6$D$_6$): d 7.36 (m, 2H, H6 and H10), 6.66 (dd, $^3$J=17.6 and 10.8 Hz, 1H, H3), 6.56 (m, 2H, H7 and H9), 5.45 (d, $^3$J=17.6, 1H, H4), 5.25 (s, 1H, H1), 5.20 (s, 1H, H1), 5.14 (d, $^3$J=10.8, 1H, H4), 2.50 (s, 6H, H11 and H12).

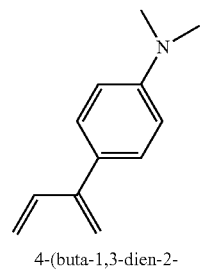

4-(buta-1,3-dien-2-yl)-N,N-dimethylaniline

Example 10

In this example, the copolymerization of 1,3 butadiene with 4-(buta-1,3-dien-2-yl)-N,N-dimethylaniline is illustrated.

The functional monomer of formula VII was synthesized as described in Example 9.

The monomer of formula VII in heptane solution (1 mmol/1.17 g heptane solution) was added to a flame-dried schlenk-flask containing 14 mL toluene and the flask was subsequently sealed with a rubber septum. Butadiene was added by saturation of the toluene at the reaction temperature with a pressure of 1.05 bar. The polymerization was initiated by adding the catalyst in toluene (5 mL) at the indicated reaction temperature. The polymerization was allowed to run at that temperature for the indicated time. 0.5 mL of NEt3 were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-4-(buta-1,3-dien-2-yl)-N,N-dimethylaniline). Samples were analyzed with results given in Table 4. Molecular weight Mn and polydispersity (PDI) were measured using GPC in THF vs. polystyrene standards. Glass transition temperature Tg was measured using DSC. The microstructure of the polymer was determined by NMR-analyses ($^{1}$H and $^{13}$C).

TABLE 4

| Sample No. | 6 |
|---|---|
| amount of catalyst, μmol | 10 + 10 + 20 |
| temperature, ° C. | r.t. |
| time, h | 2.5 |
| BD, bar | 1.05 |
| comonomer of formula VII, mmol | 0.2 |
| yield, g | 2.2 |
| comonomer incorporation, mol % | 0.11 |
| comonomer conversion, % | 22 |
| $M_n$, $10^3$ g/mol | 51 |
| PDI | 2.3 |
| $T_g$, ° C. | −97 |
| Microstructure, % 1,4-cis | 95 |

Example 11

In this example, the synthesis of N,N-dimethyl-2-(2-methylenebut-3-en-1-yl)aniline is illustrated. The functional monomer N,N-dimethyl-2-(2-methylenebut-3-en-1-yl)aniline (formula VIII) was synthesized as follows:

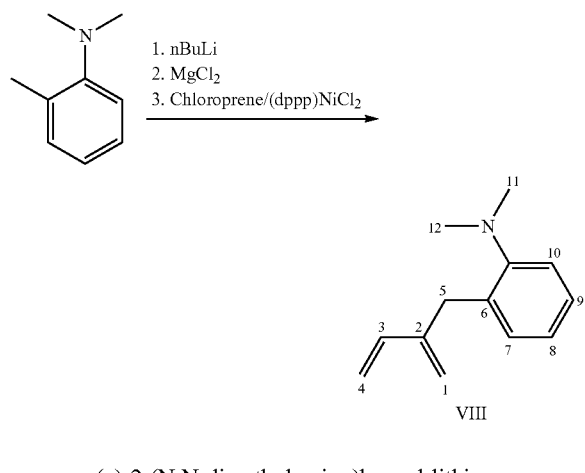

(a) 2-(N,N-dimethylamino)benzyl lithium

To a solution of 2-methyl-N,N-dimethylaninile (1.35 g, 10 mmol) in heptane (25 mL) was n-BuLi (10 mmol, 4 mL 2.5M in hexane) added by syringe. The volume was reduced under vacuum to ca 15 mL and the resulting mixture refluxed for 20 h whereby a beige precipitate of 2-(N,N-dimethylamino)benzyl lithium formed. The solid was collected by filtration, washed with pentane (3×10 mL), dried under vacuum and used without further purification.

(b) N,N-dimethyl-2-(2-methylenebut-3-en-1-yl)aniline 2-(N,N-dimethylamino)benzyl lithium thus obtained (282 mg, 2 mmol) was dissolved in thf (4 mL), anhydrous MgCl$_2$ (286 mg, 3 mmol) was added and the mixture was stirred for 20 min at 25° C. The resulting mixture was dropwise added to a suspension of (dppp)NiCl$_2$ (6 mg, 0.011 mmol) and chloroprene solution (2.2 mmol, 1.1 equiv) in 5 mL THF at 0° C. NMR analysis of an aliquot taken after 35 min at 0° C. indicates formation of N,N-dimethyl-2-(2-methylenebut-3-en-1-yl)aniline in ca 80% yield. The reaction mixtures was added to 50 mL heptane, filtrated, and the filtrate concentrated to 4.48 g heptane solution containing ca 310 mg (1.65 mmol, 82%) N,N-dimethyl-2-(2-methylenebut-3-en-1-yl)aniline.

$^{1}$H NMR (400 MHz, C$_6$D$_6$/thf-h$_8$): d 7.13 (m, 1H, H7), 7.05 (m, 1H, H9), 6.94 (m, 1H, H10), 6.88 (m, 1H, H8), 6.35 (dd, $^{3}$J=17.6 and 10.8 Hz, 1H, H3), 5.20 (d, $^{3}$J=17.6 Hz, 1H, H4), 5.04 (s, 1H, H1), 4.89 (d, $^{3}$J=10.8 Hz, 1H, H4), 4.87 (s, 1H, H1), 3.62 (s, 2H, H5), 2.45 (s, 6H, H11 and H12).

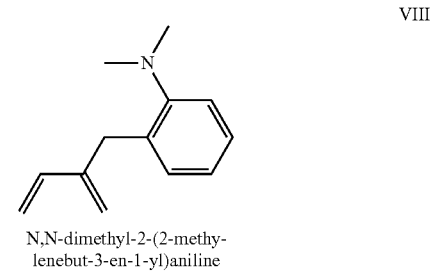

N,N-dimethyl-2-(2-methylenebut-3-en-1-yl)aniline

Example 12

In this example, the copolymerization of 1,3 butadiene with N,N-dimethyl-2-(2-methylenebut-3-en-1-yl) aniline is illustrated.

The functional monomer of formula VIII was synthesized as described in Example 11.

A heptane solution of the monomer of formula VIII was added to a flame-dried schlenk-flask containing 15 mL of toluene and the flask was subsequently sealed with a rubber septum. Butadiene was added by saturation of the toluene at the reaction temperature with a pressure of 1.05 bar. The polymerization was initiated by adding the catalyst in toluene (5 mL) at the indicated reaction temperature. The polymerization was allowed to run at that temperature for the indicated time. 0.5 mL of NEt3 were added to end the polymerization. Residual butadiene was carefully removed under reduced pressure and the polymer was precipitated in MeOH in the presence of BHT (ca. 100 mg/100 mL). The formed polymer was dried overnight at 50° C. under reduced pressure to give the indicated yield g of poly(butadiene-co-N,N-dimethyl-2-(2-methylenebut-3-en-1-yl) aniline). Samples were analyzed with results given in Table 4. Molecular weight Mn and polydispersity (PDI) were measured using GPC in THF vs. polystyrene standards. Glass transition temperature Tg was measured using DSC. The microstructure of the polymer was determined by NMR-analyses ($^{1}$H and $^{13}$C).

TABLE 5

| Sample No. | 1 |
|---|---|
| amount of catalyst, μmol | 10 + 10 + 70 |
| temperature, ° C. | r.t. |
| time, h | 3 |
| butadiene, bar | 1.05 |
| comonomer of formula VIII, mmol | 0.57 |
| yield, g | 3.3 |
| comonomer incorporation, mol % | 0.4 |
| comonomer conversion, % | 42 |
| $M_n$, $10^3$ g/mol | 28 |
| PDI | 2.2 |
| $T_g$, ° C. | −98 |
| Microstructure, % 1,4-cis | 95 |

What is claimed is:

1. A copolymer of 1,3-butadiene and a second monomer of formula I

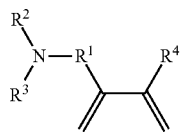

wherein $R^1$ is phenylene, or a linear or branched alkane diyl group containing 2 to 10 carbon atoms, or a combination of one or more phenylene groups and one or more linear or branched alkane diyl groups containing 1 to 10 carbon atoms; $R^2$ and $R^3$ are independently phenyl or a linear or branched alkyl group containing 1 to 10 carbon atoms, or one of $R^2$ and $R^3$ is hydrogen and the other is phenyl or a linear or branched alkyl group containing 1 to 10 carbon atoms, or $R^2$ and $R^3$ taken together with the nitrogen atom represent a nitrogen containing heterocyclic group containing from 4 to 12 carbon atoms; and $R^4$ is hydrogen or a linear or branched alkyl group containing 1 to 10 carbon atoms; wherein the copolymer comprises greater than 80 percent by weight of cis 1,4 microstructure content based on the polybutadiene content of the copolymer.

2. The copolymer of claim 1, wherein the nitrogen containing heterocyclic group is selected from the group consisting of the structures:

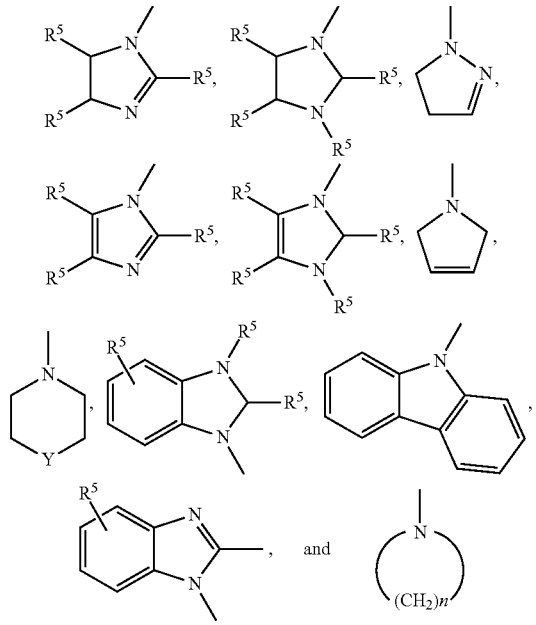

wherein $R^5$ groups can be the same or different and represent a member selected from the group consisting of linear or branched alkyl groups containing from 1 to about 10 carbon atoms, aryl groups, allyl groups, and alkoxy groups, and wherein Y represents oxygen, sulfur, or a methylene group, and n is an integer from 4 to 12.

3. The copolymer of claim 1, comprising at least 95 percent by weight of cis 1,4 microstructure content based on the polybutadiene content of the copolymer.

4. The copolymer of claim 1, comprising from 0.1 to 40 percent by weight of units derived from the second monomer based on the weight of the copolymer.

5. The copolymer of claim 1, comprising from 0.5 to 20 percent by weight of units derived from the second monomer based on the weight of the copolymer.

6. The copolymer of claim 1, comprising from 1 to 5 percent by weight of units derived from the second monomer based on the weight of the copolymer.

7. The copolymer of claim 1, wherein the second monomer is selected from the group consisting of the structures:

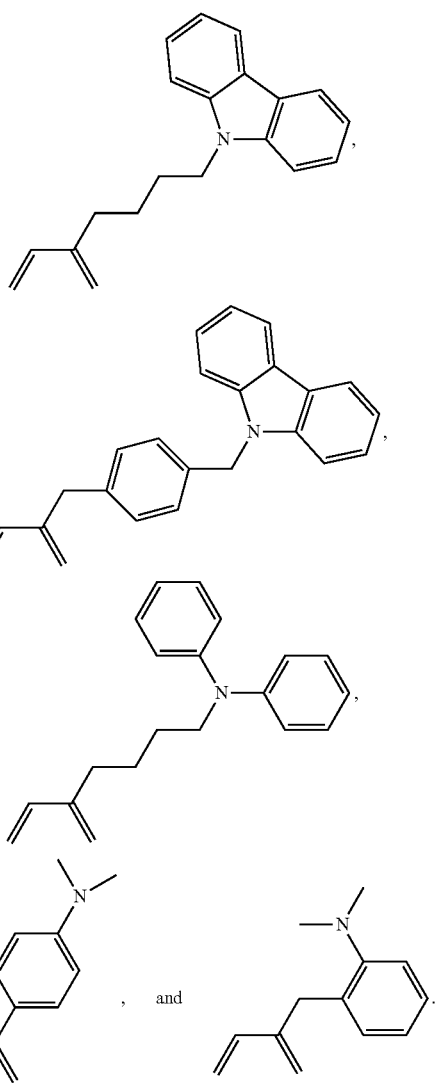

8. A rubber composition comprising the copolymer of claim 1.

9. A pneumatic tire comprising the rubber composition of claim 8.

10. A method of making a copolymer, comprising the step of polymerizing a first monomer selected from the group consisting of 1,3-butadiene and isoprene and a second monomer of formula I in the presence of an (allyl)(arene) Ni(II) polymerization catalyst

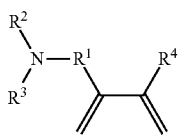

wherein R¹ is phenylene, or a linear or branched alkane diyl group containing 2 to 10 carbon atoms, or a combination of one or more phenylene groups and one or more linear or branched alkane diyl groups containing 1 to 10 carbon atoms; R² and R³ are independently phenyl or a linear or branched alkyl group containing 1 to 10 carbon atoms, or one of R² and R³ is hydrogen and the other is phenyl or a linear or branched alkyl group containing 1 to 10 carbon atoms, or R² and R³ taken together with the nitrogen atom represent a nitrogen containing heterocyclic group containing from 4 to 12 carbon atoms; and R⁴ is hydrogen or a linear or branched alkyl group containing 1 to 10 carbon atoms.

11. The method of claim 10, wherein the second monomer is selected from the group consisting of the structures:

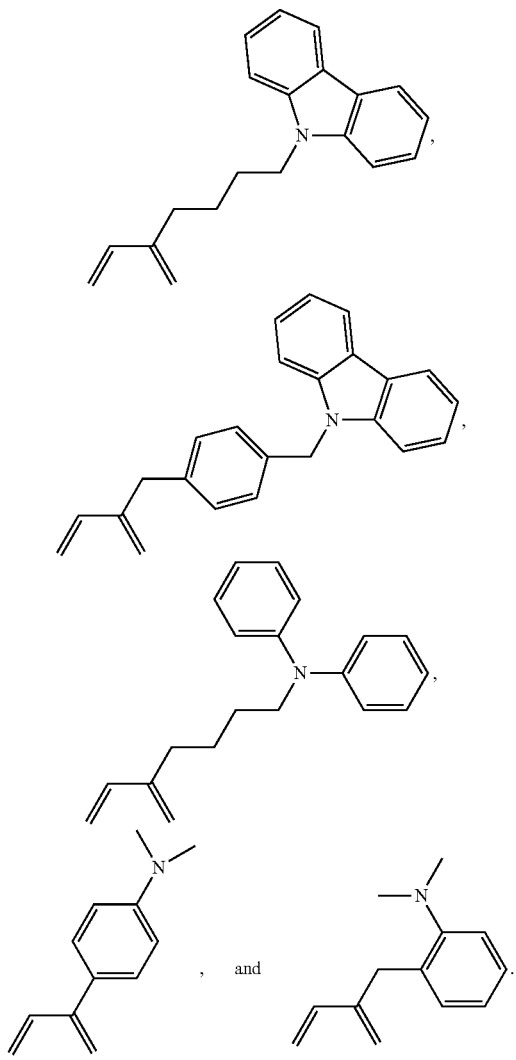

12. The method of claim 10 wherein the polymerization catalyst is of formula II

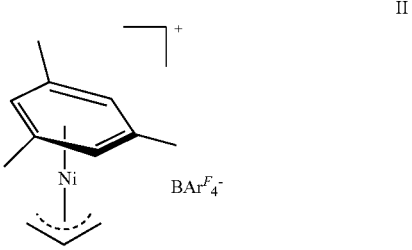

where $BAr^F_4{}^-$ is tetrakis(3,5-bis(trifluoromethyl)phenyl) borate.

13. The method of claim 10, wherein the nitrogen containing heterocyclic group is selected from the group consisting of the structures:

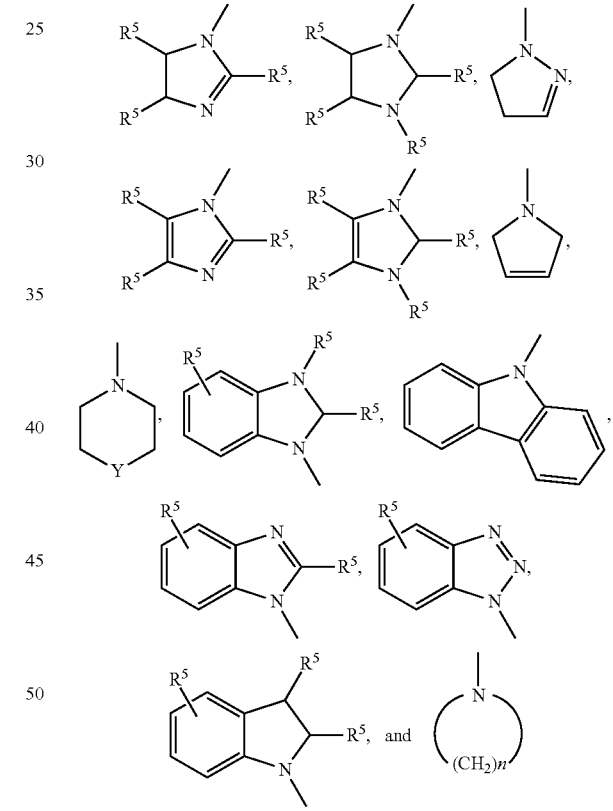

wherein R⁵ groups can be the same or different and represent a member selected from the group consisting of linear or branched alkyl groups containing from 1 to about 10 carbon atoms, aryl groups, allyl groups, and alkoxy groups, and wherein Y represents oxygen, sulfur, or a methylene group, and n is an integer from 4 to 12.

\* \* \* \* \*